Patented May 13, 1930

1,758,734

UNITED STATES PATENT OFFICE

HARRY V. McCLELLAN, OF SEATTLE, WASHINGTON, ASSIGNOR TO ERNEST S. Mc-CLELLAN, OF CRAWFORDSVILLE, INDIANA

INSECTICIDE

No Drawing.        Application filed February 24, 1927. Serial No. 170,745.

My invention relates to the art of exterminating insects and to an insecticide. More particularly my invention relates to the process of exterminating an insect by causing an insecticide in a finely comminuted form to adhere to the insect's surface body or appendages, and then utilizing the instinct of the insect to purge its body of the foreign matter by rubbing its appendages against its purging glands and drawing them through its mouth as the method of introducing even against the insect's will the insecticide into its body, wherein the insecticide combines with the carbon dioxide and water constituting a considerable part of the anatomical structure of the insect to form the poison in a gaseous form of formaldehyde and formic acid.

Heretofore there have been three types of insecticide: (1) An insecticide designed to be eaten. This may be applied as a spray upon the foliage and the insect upon eating the leaf takes into its body the poison chemical compound constituting the insecticide, or it may be set out as a bait and designed to be eaten by the insects even apart from the foliage of the plant to be protected. Serious objection to depending upon the insect eating the foliage obtains in that insects generally refuse to eat foliage having dust thereon. Also there are insects which have a proboscis that permits them to obtain their food by sucking. This type of insect is able therefore to extend its proboscis through any foreign matter adhering to the foliage itself without obtaining any of the insecticide, and furthermore, serious objection obtains to this first type of insecticide when applied as a bait in that children, birds, cats or dogs for whom the poison was not intended whatsoever may eat the bait and thus be positioned; and (2) a second type of insecticide is that designed to drown the insect by immersion, i. e., upon spraying it upon the foliage it is there in such quantities that it in reality acts by way of drowning the insect. Serious objection obtains to this second type of insecticides in that there are many insects that are of too large a size and too strongly constituted to be thus trapped by immersion. Under immersion may also be considered liquid contact spray which settles upon the insect's body and forms a coating thereon, thereby cutting off his respiration. Rather than a coating this may be called a film which is absorbed through the breathing pores of the body and thus results in his poisoning. The general objection to this type of insecticide is that it is not only destructive of the insect but is also destructive of the foliage. A third type of insecticide is that where it is in a dust form, and while upon the body of the insect emits a gas which, absorbed by the breathing of the insect, enters the air tubes and thus kills it. This type is objectionable in that it is very expensive and also is ineffective as well as poisonous. In reality, it operates more as a repellant, and furthermore, it is readily dissipated, losing its strength in the air.

In contrast with these types of insecticide my invention involves the use of an insecticide which is non-poisonous and is harmless to children, birds, cats and dogs, and may be introduced into the body of the insect even against its will, or it may reach the interior of the insect's body along with the foliage which may be eaten and when in the inside of the insect's body, it, there in combination with the carbon dioxide and water which primarily constitute the anatomical structure of the insect forms it is believed the poisons, formaldehyde and formic acid in the form of gases which cause the insect forthwith to be killed.

Another distinct advantage of using a non-poisonous powder obtains in those agricultural sections where bees are in operation. Bees are peculiarly constructed to carry powders. In the case of poisonous insecticide, particularly those using arsenic, the bee carries the arsenic compound into honey and onto other fruits and this particularly at a time when the fruit is ripe and ready to eat.

My invention involves the introducing of this powder by utilizing the instinct of the insect to free itself of all foreign matter which may come upon its body. I have found that this is one of the very strong instincts of insect life, namely, to free its body or appendages of any and all foreign matter which adheres thereto. I also find that there are in many insects regular purging glands. In purging itself of the foreign matter it may rub its leg or antenna against the purging glands and thus rub the insecticide, in a very finely comminuted form into the said glands or it may draw its appendages through its mouth and thereby introduce the insecticide into its body.

This is one primary characteristic of my invention, namely, that it does not depend upon the insect taste to eat the foliage sprayed with the insecticide, nor does it depend upon drowning the insect by practically immersing it therein, but the insect even against its will is caused to introduce the insecticide into its body. Thus my insecticide is much more effective in exterminating the insect. I provide an insecticide of a character which causes the insect to fight the adherence of the same to its body most violently.

For purposes of clearness and definiteness of illustration I will describe my invention as applied to the insects known as "earwigs". This particular pest constitutes a very severe test for any insecticide. In the first place, it has a very strongly constituted body, so that it has no difficulty in quickly freeing itself from all ordinary immersion insecticides. It has particularly great strength, also, even with its head off. Actual experiment has shown that the earwig is capable of running about for a period of two days and two nights and a half a day after being beheaded. This illustrates the stamina of the insect and shows that the head is not a vital part of its body, and, therefore, he must be reached by other methods which I do by introducing the powder into his body by reason of its instinct to free itself of all foreign matter. Earwigs are further characterized by being most wary, and, therefore, are difficult to kill by way of causing them to eat foliage which is sprayed or as bait. Possibly no other insect has constituted a more serious menace than the earwig. It has caused the Government to prohibit the importation of many bulbs and plants thereby seriously affecting extensively developed industries and has caused the loss of thousands of dollars worth of property. My insecticide is effective in eradicating besides earwigs, boll weevils and all insects or worms in any place where they may inhabit, congregate or pass over.

Heretofore, it has been attempted to eliminate this pest by baiting and the insecticide thus applied ordinarily has arsenic as the poison chemical compound. That is, a substance such as bran, is soaked in a Paris green solution. Not only is this not always effective in eliminating the pest, but is seriously objectionable in the case of earwigs in that they may live for from ten to forty-eight hours thereafter, according to the strength of the bait. In the meantime they will track over the shelves or over food in the cupboards and carry with them particles of the poison and thus contaminate the victuals designed for human consumption. This results even though the bait be applied outside of the house around the flower beds and the like, because it is the instinct of earwigs to come forth in the night time and forage in the darkness. Upon daylight approaching they run to dark corners, and particularly to cupboards in the interior of the house readily entering under doors and through the small screens over the small openings of the so-called cooler cupboards.

A very important condition, therefore, to be observed in providing an insecticide is that it be of such strength that it will kill the insect promptly. Experiments with my insecticide have proven that the slightest exposure to the insecticide embodying my invention such as merely running over a very small quantity of the same, so that only a few particles may be caused to adhere to its body, will cause the earwig to die in about ten hours. At least he will be so invalided that he will not be able to reach any cupboards if he contacts the poison outside of the house where it may be applied by way of protection to plants. However, if he comes into contact with a larger amount, he dies in thirty to forty minutes.

The most effective of the insecticides heretofore commonly employed in pure unadulterated powder form permit the earwig to live from about three and a half to five hours. These are results of actual tests.

Furthermore, the insecticide should be harmless as this is important to children, birds, dogs, cats and even to vegetable life for many insecticides heretofore commonly provided injure the leaves by burning them when applied in sufficient quantity to have any practical effect upon earwigs.

Furthermore, an important condition which must be satisfied is that the base of the insecticide must be insoluble in water so that it will not be quickly dissipated in the event of a rain or heavy dew coming upon the plant, also a further important condition is that the insecticide must be of a powder form and this in a very minute character and also that it will continue as a powder as it is important that the insecticide be of such light weight that it may readily attach itself to the insect. Most insecticides as heretofore provided become lumpy and this results in the same being eaten by birds and other animal life for whom it is not intended.

A further important condition is that while the insecticide must be a powder it must have the further quality of being adhesive, so that it will adhere to the body of the insect, and will result in the insect applying its foreign matter removing means energetically. Also, in providing a chemical compound which will have these characteristics it should have the further highly important property of not being readily oxidized so that it will be free when introduced into the body of the insect to unite readily with the carbon dioxide and water elements of the insect's anatomical structure to form therein and therewith a poison, and it is further important that it form a poison in the form of a gas so that it is more readily dispersed throughout the body of the insect, destroying thereby the more quickly its powers of locomotion. The prevention of oxidation presents a most serious condition.

Also an important characteristic is that the insecticide must not necessarily be used in excess as it is thereby liable to be injurious to vegetable life, at the same time, it must be of necessary strength to kill the insects. Moreover, a successful insecticide in the case of earwigs must not be of an objectionable color. Any chemical compound in the powder form which is glaringly bright is far less effective than one which presents no strong contrast with the soil or vegetation, i. e., the insecticide should be of a dark color. Likewise, the insecticide should not be of an objectionable odor.

Furthermore, the insecticide must be of a character which will adhere to perpendicular surfaces, such as stems of plants, trees, fences, walls, rocks and such like.

Another feature, from the manufacturing point of view, must be satisfied, namely, the material must be cheap so that people generally, even those of small means, can afford to buy the same, for obviously the extermination on one property will be ineffective if the insect is not removed on adjoining property. A primary characteristic of my invention is that it has as a base a chemical which is easily produced and is very cheap since it may be produced as a by-product of other processes.

In general, therefore, a primary object of my invention is to provide an insecticide which will satisfy each and all of the above conditions, and also a primary object of my invention is to provide a method of introducing the insecticide into the body of the insect independent of the insect eating the foliage and independent of the drowning effect by immersion in the insecticide.

The insecticide is to be applied as a dusting powder or in a water suspension and solution form. The manner and process of making it is by mixing together in dry form one inorganic and two organic compounds. The question may arise, if this poison is so deadly to insects, why is it not likewise poisonous to children, birds, cats and dogs? The reason is that in the case of the insect the carbon dioxide and water or juices constitute or permeate in large measure its anatomical structure. In the higher forms of life there is such a large percentage of other elements that there is practically no injurious effect. Furthermore, be it noted, that this insecticide is to be spread upon the foliage in a powdered form, and therefore is not in such form as to be eaten readily either by children, birds, cats or dogs.

This is further understood the better when it is remembered that an insect must breathe. In carrying on locomotion it is evident that considerable energy must be liberated and used. This like other body activities is possible only as a result of the process of respiration. As the insect must be liberally supplied with oxygen, and as a result of this process of respiration carbon dioxide is produced and must be given off from the body. Also insects depend largely upon vegetation which is highly productive of carbon dioxide. In the insect the openings for breathing are not found on the head as in the higher forms of life. These in the insect are found along the sides of the body—at least one pair of breathing pores (spiracles) occurring one on either side of both of the segments of the thorax and abdomen. While the above is true of insects as a rule, in the case of the earwig, on each side of the dorsal aspect of the fourth abdominal segment (third visible segment) is a small fold in the integument. A similar but smaller structure is located on the third segment. These folds mark the orifices of certain glands which are the openings through which the insect breathes. Each breathing orifice or pore leads into a tiny tube which connects with the tubes from other pores and these breathing tubes extend to all parts of the body and even out into the veins of the wings. In this way all parts of the insect are supplied with oxygen and from all parts of the body carbon dioxide is removed. As in the human body oxygen and carbon dioxide are carried in a definite system of tubes, but unlike in the higher forms of life these tubes in insects carry gases only and not blood. Each segment of the abdomen of an insect consists of an upper portion and a lower portion connected by a flexible membrane. When the lower part of each segment is moved upwards the size of the body is decreased and so pressure is exerted on the air tubes. In consequence, air, with its weight of carbon dioxide, is forced out through the breathing tubes. As in the higher forms of life, the breathing tubes in insects are composed of elastic material, and the tubes therefore renew their former size after removal of the pressure. When the under side of the abdominal segment is moved downward the elastic tubes enlarge, air rushes into the breathing pores so that oxygen is supplied to all parts of the body.

In the process of applying the insecticide to the earwig, the poison hereinafter described forms in a gaseous form and attacks the breathing tissues of the insect causing them to harden, swell and lose their functional properties and causing respiration to be stopped.

When the earwig, for example, comes in contact with the insecticide explained herein and embodying my invention he attempts to clean his body of it and passes the hind tarsi over these glands and back along the abdomen. In doing this, he works it into the glands, as well as into the segment of his back or shell, thereby clogging the openings. Thus he tends to cut off respiration in these parts as well as works the insecticide into the interior of his body where the poisonous gases are formed. Also, the legs of the insect and its antennæ especially are continually run through his so-called "compound mouth" thus allowing entrance to the body interior of the insecticide as well as through the glands above mentioned.

As the base of my insecticide I use ferrous carbonate coated against oxidation. This coating should be one that is seductive or at least is not objectionable to insects. This coating may be sugar. The ferrous carbonate thus coated is in the form of a very finely comminuted powder being a precipitate, and may constitute the insecticide in and by itself. This base of ferrous carbonate is insoluble and the dew of the night only adds to its adhesiveness. It is manifest that the soul of my invention pertains in large part to the smallness of the size of the particles involved or the particles would not be of a size to permit of their effectively adhering to the hair that actually covers the entire body of the insect. The size of these particles preferably would be not to exceed one-five hundredth of an inch in diameter, and manifestly the finer the better. In my experiments, I use about one-one-thousandth of an inch.

The addition of starch in a very comminuted form gives an adhesive quality to the product that makes it very difficult for the insect to rid itself of the insecticide. Also, the starch gives body to a given quantity of the saccharated ferrous carbonate powder, and thereby gives spreadability so that more area is covered. This results in maximum effectiveness for the given quantity. Obviously, the base element being of such an unpalpable powder, it may easily fall when undiluted in excess on a given small area, but the starch helps to spread the same, so that maximum effectiveness results.

Relative the proportions constituting the elements of my insecticide: The strength of the ferrous carbonate obtainable in the market is very variable. In some of the poorer manufacturing processes of saturated ferrous carbonate the yield of pure ferrous carbonate is not less than fifteen per cent but may be adulterated of course by the manufacturer down to any percent desired. When adulterated with saccharated (sugar) material to a point below five per cent it would become practically useless as a killing compound for insects. The best grade of saccharated ferrous carbonate under ordinary excellent manufacturing conditions contains about seventy five per cent of ferrous carbonate. The remaining twenty five per cent of the saccharated ferrous carbonate product is the protective coating against oxidation, namely, sugar. Included in the above so-called pure ferrous carbonate are traces of oxides and hydroxides and bicarbonate of iron,—these resulting from oxidation. Oxides are to be figured in the sugar portion of the percent i. e., when it is stated in the above that the poorer manufacturing processes yield ten per cent of pure ferrous carbonate, I mean pure ferrous carbonate exclusive of all oxides and sugar.

My experience with ferrous carbonate as an insecticide shows that owing to poor processes of manufacture or excessive exposure it develops as much as fifty per cent of hydroxide. The hydroxide is in itself an insecticide and is therefore not objectionable.

Having thus seen that the strength of the ferrous carbonate, i. e., saccharated ferrous carbonate may thus greatly vary, it is to be noted that when the poorer grades, i. e., where there is only ten per cent pure ferrous carbonate present, in that instance there could be no adulteration by starch or saccharine and still have an effective killing insecticide. In that instance I would choose the ferrous carbonate having the ten per cent strength without any adulteration. From this it is manifest that there must be present in an effective insecticide of at least ten per cent pure ferrous carbonate.

Relative the proportions of saccharine—my experience teaches that there should not be more than one per cent of saccharine present in the insecticide, because more than one per cent is so sweet that it is repellant to the insect.

Respecting the chemical action that takes place between my insecticide and the elements composing the anatomical structure of the insect, it is believed that the following is the situation:—

The ferrous carbonate or body of the composition of matter, worked into the orifices of the insect, comes into contact with the juices and water of the interior, which water decomposes the ferrous carbonate into ferric oxide, carbonic acid and formic acid. The ferric oxide acts as a clogging agent while formic acid acts as a poisonous agent, producing carbon monoxide, a most poisonous gas.

According to the conclusions reached by Friend after experimenting (Text Book of Inorganic Chemistry, vol. 9, part 2, page 68), the chemical reactions are thought to be as follows:

$$2FeCO_3 + 2H_2O = Fe_2O_3 + H.COOH + H_2CO_3$$

The process is continuous in that the carbonic acid is then free to dissolve more iron, but after each neutralization its amount is reduced by some fifty per cent in consequence of the formation of formic acid.

The formic acid formed attacks any free metal that may be present yielding ferrous formate, viz.

$$Fe + 2H.COOH = Fe(CHO_2)_2 + 2H$$

A portion of the formate is reduced by nascent hydrogen yielding formaldehyde and ferric oxide.

$$2Fe(CHO_2)_2 + 4H = Fe_2O_3 + 3H.CHO + H.COOH.$$

The formaldehyde passes into the system while the liberated formic acid is free to attack more free metal that may be present.

From the foregoing it is evident that the ultimate fate of the carbon dioxide is conversion into formaldehyde, so that a trace of carbon dioxide cannot be expected to catalytically assist the oxidation of an infinite quantity of iron as theoretically it should be capable of doing according to the simple cycle first described as occurring in the presence of air. Be it noted that the reactions are believed to be the correct explanations of the deadly effect from the insects resulting from the use of my invention. At no place herein do I wish to be understood as stating that these positively are the chemical reactions. They are given in the authority cited by way of explanation. The fact is, the insecticide embodying my invention has the remarkable deadly effect on earwigs as stated,—be the explanation what it may.

My insecticide acts rapidly since the insect begins fighting the powder immediately in order to rid itself of it. Great activity in fighting the insecticide embodying my invention only the more quickly results in his death. The formaldehyde produced as described above operates to harden the tissues of the orifices causing them to become dormant, stopping respiration because of the paralyzation inwardly, and the distress incident thereto the insect works his legs all the harder in the sides of his body and drawing them through his mouth.

I claim:

1. The process of exterminating an insect by causing to be applied to and into its body ferrous carbonate in powder form.

2. An insecticide embodying powdered ferrous carbonate.

3. An insecticide embodying at least ten per cent by weight pure powdered ferrous carbonate.

4. An insecticide embodying ferrous carbonate powdered to a degree of fineness that the particles do not exceed one-five hundredth of an inch in diameter.

In witness whereof I hereunto subscribe my name this 19th day of February, A. D. 1927.

HARRY V. McCLELLAN.